July 10, 1951 S. W. MEEK 2,559,782
PIPE WIPER WITH IMPROVED CENTRAL PASSAGE ARRANGEMENT
AND SEAL SECTION ASSEMBLY
Filed June 29, 1948 3 Sheets-Sheet 1

Samuel W. Meek
INVENTOR.

BY *Clarence A. O'Brien*
*and Harvey B. Jacobson*
Attorneys

July 10, 1951    S. W. MEEK    2,559,782
PIPE WIPER WITH IMPROVED CENTRAL PASSAGE ARRANGEMENT
AND SEAL SECTION ASSEMBLY
Filed June 29, 1948    3 Sheets-Sheet 2
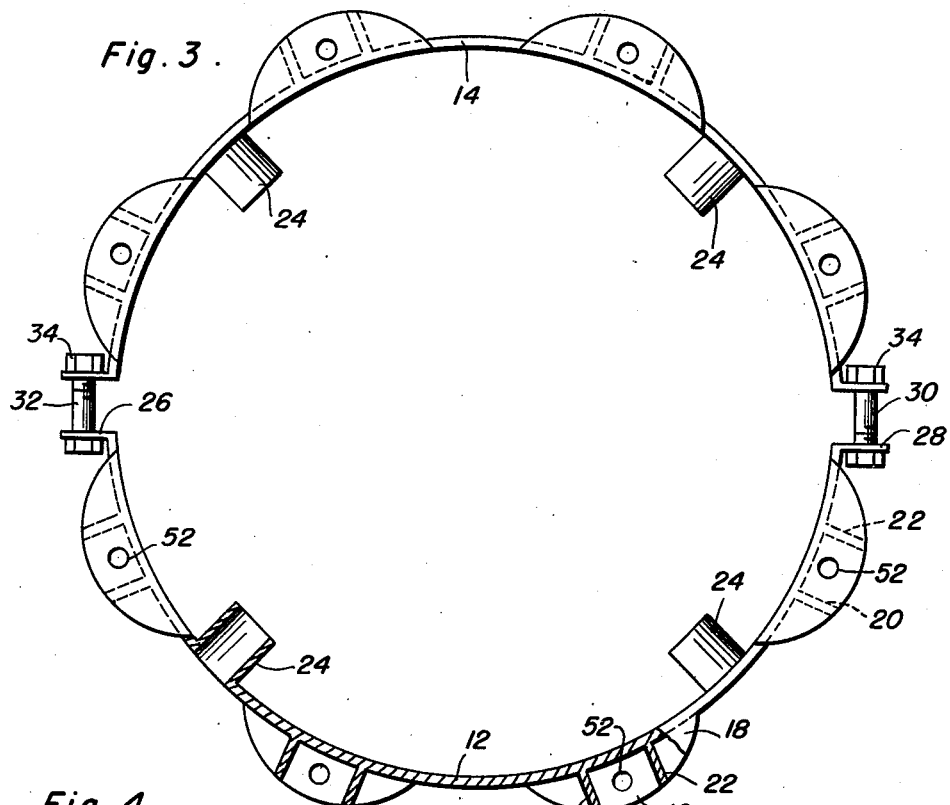
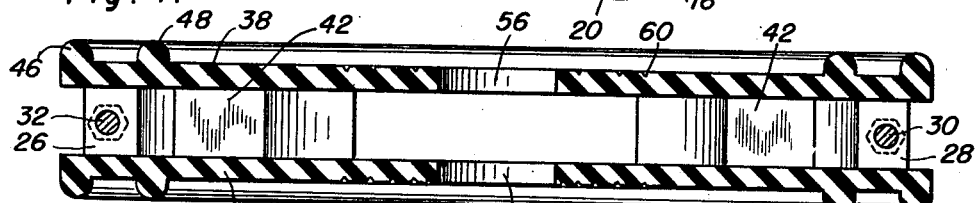
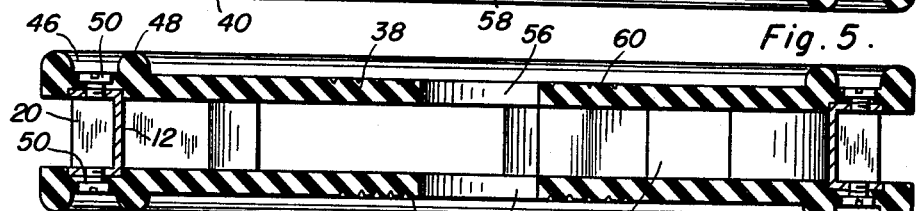
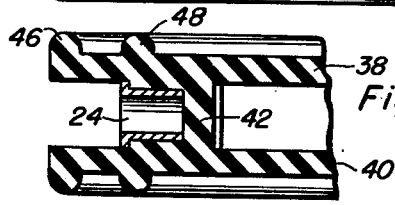
Samuel W. Meek
INVENTOR.
BY Clarence A. O'Brien
and Harvey B. Jacobson
Attorneys July 10, 1951 S. W. MEEK 2,559,782
PIPE WIPER WITH IMPROVED CENTRAL PASSAGE ARRANGEMENT
AND SEAL SECTION ASSEMBLY
Filed June 29, 1948 3 Sheets-Sheet 3

Samuel W. Meek
INVENTOR.

BY
Clarence A. O'Brien
and Harvey B. Jacobson
Attorneys

Patented July 10, 1951

2,559,782

UNITED STATES PATENT OFFICE 2,559,782

PIPE WIPER WITH IMPROVED CENTRAL PASSAGE ARRANGEMENT AND SEAL SECTION ASSEMBLY

Samuel W. Meek, Odessa, Tex., assignor of one-half to William W. Fortenberry, Odessa, Tex.

Application June 29, 1948, Serial No. 35,889

7 Claims. (Cl. 15—210)

This invention relates to novel and useful improvements in pipe wipers for use in oil wells particularly.

An object of this invention is to adjustably mount a seal around a pipe or sleeve associated with and forming a portion of oil well drilling apparatus in order to clean the pipe or tubing by simply removing the same from its supporting structure.

Another object of this invention is to provide an improved device for carrying out this function which includes an adjustability feature in order to accommodate relatively larger and smaller sized tubes or pipes and also to compensate for normal wear on the seal.

Another object of this invention is to provide concentric grooves about a central aperture in the seal in order to further accommodate different sized pipes and the like and to enhance the cleaning characteristics of the device.

A still further object of this invention is to provide an improved seal for use in association with the described apparatus which includes a pair of spaced substantially flat portions connected by integral blocks.

Ancillary objects and features of novelty will become apparent to those skilled in the art, in following the description of the preferred form of the invention, illustrated in the accompanying drawings, wherein:

Figure 3 is a plan view and shown partly in section of the sectional clamp forming a portion of the invention;

Figure 4 is a sectional view taken on the line 4—4 of Figure 1 and in the direction of the arrows;

Figure 5 is a sectional view taken on the line 5—5 of Figure 1 and in the direction of the arrows;

Figure 7 is another detail of construction shown in section.

Figure 1:
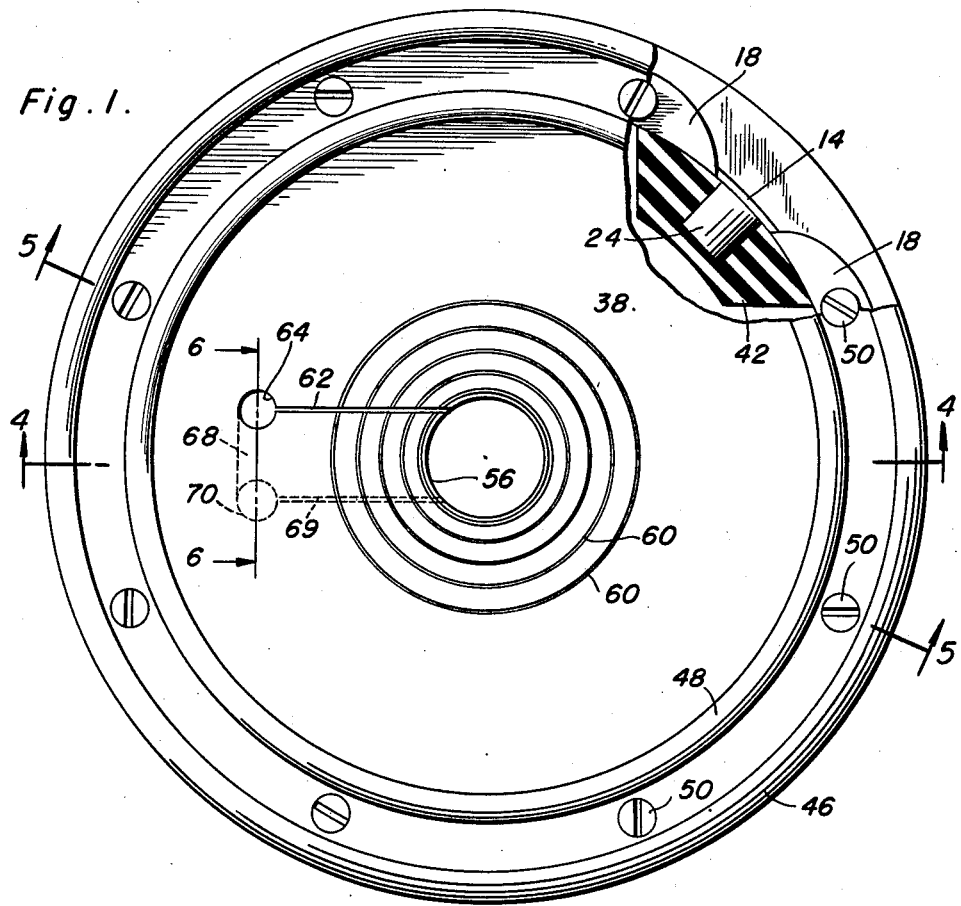
Figure 1 is a plan view of the preferred form of the invention.
Figure 2:
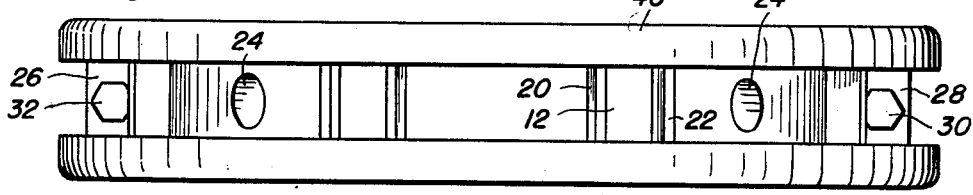
Figure 2 is a side view of the invention shown in Figure 1.

This invention relates to improvements in pipe wipers. The drill pipe wipers are utilized in association with oil well drilling apparatus when pulling drill pipe or tubing out of the hole and also used when returning the drill pipe or tubing in the hole.

In pulling certain portions of conventional drilling rigging from the ground, mud and other undesired refuse clings to the pipe or tubing thereby rendering work adjacent this area inconvenient to the workmen. It is one of the prime purposes of the invention to clean this tubing or pipe while it is being removed from the ground. The structure for performing this function and other functions may be seen best by a correlation of the figures of the drawings. A sectional clamp is provided of a metallic material and may include any number of sections which is practical. For illustrative purposes there is shown a sectional clamp composed of two sections (see Figure 3). However, it is within the purview of the invention to utilize any practical number of sections, the number being dictated by sound engineering principles.

The sections include arcuate bands 12 and 14 respectively, each of which is identical with the other. The said section 12 has pairs of perches 16 and 18 respectively positioned at spaced intervals therearound. Ribs 20 and 22 join the spaced perches 16 and 18 the ribs, perches and band 12 being integral.

Pintles, preferably hollow lugs or sleeves 24, are spaced between the pairs of perches and are to serve the purpose of a fastening means to be described subsequently.

The ends of the said band 12 have flanges 26 and 28 respectively integral therewith and are apertured in order to accommodate adjustable means for joining sections of the clamp. The preferred adjustable means may be seen best in Figure 3 and is obviously a pair of conventional bolts 30 and 32 respectively having nuts 34 thereon. Through this expedient simply tightening the bolts and nuts relative to each other brings the two sections 12 and 14 together for adjustment purposes.

An improved seal is provided in association with the sectional clamp and includes the following structure. A pair of spaced flat resilient portions (preferably rubber) 38 and 40 respectively are spaced by means of integral blocks 42. These blocks are formed with apertures (unnumbered) in order to accommodate the sleeves 24 in clamping arrangement. It is clearly evident from inspection of Figures 4–7 that the flat portions 38 and 40 overlie the clamp sections 12 and 14 and that beads 46 and 48 are supplied adjacent the marginal edge of each flat section 38 and 40. Between the beads 46 and 48 there is supplied a number of apertures with small screws, rivets or the like 50 extending therethrough which attach firmly to the perches 18 and 20 and more specifically, through suitable apertures 52 provided therein. This of course maintains the seal in place on the sectional clamp.

Central apertures 56 and 58 respectively are provided in the flat portions 38 and 40 of the said seal in order to accommodate drill pipe, sleeves, tubing or the like. A plurality of concentric grooves 60 are provided about the central apertures to serve a dual function. In pulling the sleeve or pipe through the device refuse is scraped from the exterior surface of the sleeve or pipe and the grooves 60 are used as an abrading surface. Further, when it is desired to accommodate relatively larger or smaller sleeves or pipes the apertures 56 and 58 may be enlarged by cutting along selected ones of these grooves.

Figure 6:
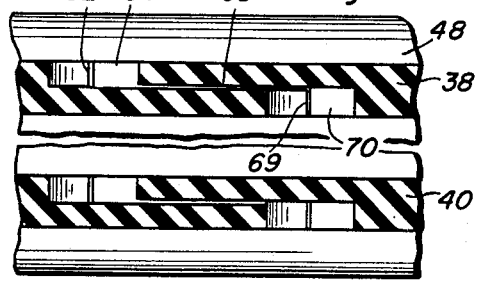
Figure 6 is a fragmentary sectional view taken on the line 6—6 of Figure 1 illustrating details of construction.

A vertical slot 62 is provided in the material of each flat portion connecting an upper aperture 64 with the central aperture 56. A horizontal connecting cut 66 intermediate the upper and lower surfaces of the flat portion 38 joins a lower aperture 70 with the upper aperture 64, and the slot 69 connects the aperture 70 with the central aperture 56, as is seen in Figure 6. This structure allows flexibility in each flat portion and also renders it facile to cut the aperture 56 and the aperture 58 to the desired size.

In installing the device, the master bushing which is conventional in well digging and drilling apparatus, is removed and the device is placed. Then the master bushing is replaced and the invention may be rendered operative, cleaning the drill pipe or tubing.

The ordinary drill pipe has two joints which are larger than the pipe and also has a number of drip pipe protectors which also slide through the seal. Thus, wear is caused in the seal and by manipulation of the screws 30 and 32 and the nuts 34 the wear may be compensated for thus rendering the invention efficient in operation at all times. A tight fit is essential in the efficiency of the device.

Figure 8:
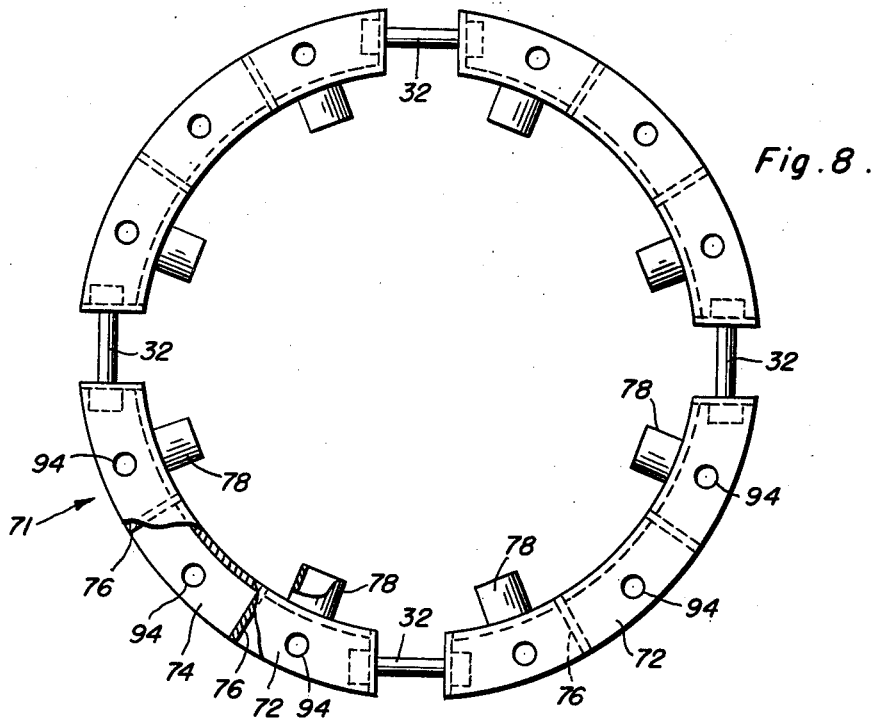
Figure 8 is a plan view of a sectional clamp illustrating the second embodiment of the invention, with portions broken away in section to illustrate details in construction.
Figure 9:
Figure 9 is a bottom plan view of one of the seals used in association with the clamp.
Figure 10:
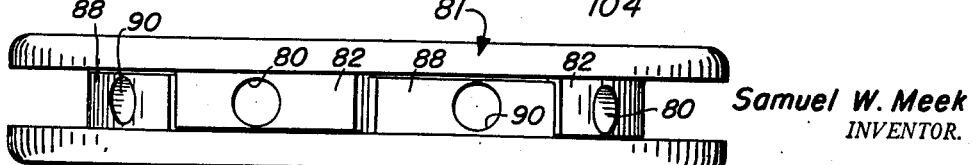
Figure 10 is an end view of two of the seals assembled, with the clamps removed.

Attention is now directed to Figures 8, 9 and 10 wherein the second form of the invention is illustrated. This second embodiment includes a sectional clamp generally indicated at 71 and composed of four identical sections. In this form of the invention the sections are connected together by means of screws 32 with the usual nut elements at the proper ends of the screws 32 with the usual nut elements at the proper ends of the screws. Relatively long perches 72 and a plurality of juxtaposed spaced perches 74 are provided on each section. Dividing ribs 76 are positioned at selected intervals between the spaced perches 72 and 74 are provided at predetermined intervals for stiffening purposes.

Pintles, which are preferably sleeves 78, are attached to each section in order to penetrate openings 80 in the seals 81 and 86, one of which is illustrated in Figure 9.

The seals in this instance are formed in two sections, upper and lower, and the seal or section 81 has integral blocks 82 on one surface thereof. These integral blocks have the said openings 80 formed therein which are penetrated by the sleeves 78.

It will be noted that the integral blocks 82 are formed on a circle adjacent but not at the peripheral edge of the seal section. The central portion of each seal is identical to that shown in Figure 1 as is apparent from inspection of Figure 9.

The lower or complemental seal section generally indicated at 86 (Figure 10) is of identical structure to the seal sections shown in Figure 9 and includes blocks 88 with openings 90 formed therein. The last mentioned blocks 88 are fitted between the said blocks 82 and in this instance two sleeves 78 penetrate the openings 90 and 80 respectively, both sleeves being in a single clamp section. In this manner the resulting composite device is formed.

Apertures 92 are positioned between the blocks 82 (and blocks 88) and the marginal edges of each seal section. Similar apertures 94 are formed through the upper and lower perches 72 and 74 in order to accommodate screws for further insuring rigidity of structure in forming the seals.

There is a slot and aperture assembly in the seal sections 81 and 86 somewhat similar to the equivalent assembly in the first described modification of the invention. In the section 81 the central opening 56, which forms a passage for a work piece, has the grooves 60 thereadjacent. A slot 98 connects the aperture 100 with the central aperture 56. Neither the slot 98 nor the aperture 100 passes entirely through the material of the seal section rather, they are formed in one surface thereof. An aperture 102 and slot 104 is formed in the opposite surface of the seal section 81, the slot 104 connecting the aperture 102 with the central opening 56. The slot 104 and the aperture 102 extend only partially through the material of the section 81.

This embodiment differs from the first described one in that the slots 98 and 104 converge as they approach the central aperture. Secondly, the slots 62 and 69 are vertical whereas the slots 98 and 104 are formed at an angle with respect to the vertical. The horizontal slot 106 connecting the slots 98 and 104 is similar to the horizontal slot 68 and differs only in shape due to the convergency of the slots 98 and 104.

Having described the invention, what is claimed as new is:

1. In a pipe wiper construction, a plurality of clamp sections, means adjustably joining said sections, a seal including a pair of flat portions of resilient material, axially extending blocks integral with said flat portions maintaining said portions in fixed spaced relation, radially disposed pintles attached to said clamp sections and imbedded in said blocks, and said flat portions each having an aperture therein to accommodate a work piece.

2. In a pipe wiper construction, a plurality of clamp sections, means adjustably joining said sections, a seal including a pair of flat portions of resilient material, axially extending blocks integral with said flat portions maintaining said portions in fixed spaced relation, radially disposed pintles attached to said clamp sections and imbedded in said blocks, each of said flat portions having an aperture therein forming a passage for a work piece, concentric grooves associated with said central aperture and formed in said flat portion, a slot connected with said central aperture crossing said concentric grooves, ribs on each of said flat portions overlying said clamp sections and means fastening said ribs to said clamp sections.

3. In a pipe wiper construction, a plurality of clamp sections, means adjustably joining said sections, a seal including a pair of flat portions of resilient material, axially extending blocks integral with said flat portions maintaining said portions in fixed spaced relation, radially disposed pintles attached to said clamp sections and imbedded in said blocks, each of said flat portions having an aperture therein forming a passage for a work piece, concentric grooves associated with said central aperture and disposed in said flat portions, a slot connected with said central aperture crossing said concentric grooves, ribs on each of said flat portions overlying said clamp sections, said clamp sections having perches integral therewith, and fastening elements extending through said flat portions between said ribs and anchored to said perches.

4. In a pipe wiper assembly, a plurality of clamp sections, means adjustably joining said sections, a seal including a pair of substantially flat portions of resilient material, axially extending blocks fixed to said flat portions maintaining said portions in fixed spaced relation, radially disposed pintles attached to said clamp sections and operatively connected with said blocks, and each of said flat portions having an aperture therein forming a passage for a work piece.

5. A pipe wiper comprising a plurality of clamp sections, adjustable means joining said sections, a seal having an aperture forming a work piece passage and attached to said sections, said seal including a first and second spaced substantially flat portion overlying said clamp sections, means fastening the overlying portions to said clamp sections, said first section having a pair of spaced slots with ends opening into said aperture, said slots being laterally spaced and in opposite faces of said first portion and passing only partially through said first flat portion, and a slit connecting both slots of said pair of slots.

6. The combination of claim 5 and concentric grooves in one of said flat portions adjacent said aperture with one of said slots passed through at least some of said grooves.

7. In a pipe wiper construction, a plurality of clamp sections, means adjustably joining said sections, a seal including a pair of flat portions of resilient material, axially extended blocks fixed to said flat portions maintaining said portions in fixed spaced relation, radially disposed pintles attached to said clamp sections and embedded in said blocks, each of said flat portions having a hole therein providing a work piece receiving central aperture, concentric grooves associated with said central aperture and formed in at least one portion, a slot in one portion connected with said central aperture crossing said concentric grooves, a second slot laterally spaced from said first slot and in the same portion connected with said central aperture, said slots extending part way through said flat portion and from opposite sides thereof, and a slit formed in the same portion as said slots, said slit extending in substantially the same direction as said portion and connecting said first and second slots.

SAMUEL W. MEEK.

REFERENCES CITED

The following references are of record in the file of this patent:

UNITED STATES PATENTS

| Number | Name | Date |
| --- | --- | --- |
| 204,625 | Silsbee | June 4, 1878 |
| 1,641,921 | Crowell | Sept. 6, 1927 |
| 1,801,995 | Bell | Apr. 21, 1931 |
| 1,840,334 | Schuster | Jan. 12, 1932 |
| 1,868,794 | Fuller et al. | July 26, 1932 |
| 1,875,577 | Endsley | Sept. 6, 1932 |
| 2,029,855 | Chambers | Feb. 4, 1936 |
| 2,068,665 | Douglass | Jan. 26, 1937 |
| 2,147,250 | Freeman | Feb. 14, 1939 |
| 2,193,158 | Gavin | Mar. 12, 1940 |
| 2,241,448 | Elbourn | May 13, 1941 |
| 2,272,395 | Ballagh | Feb. 10, 1942 |
| 2,285,742 | Miller | June 9, 1942 |
| 2,328,127 | Crickmer | Aug. 31, 1943 |
| 2,514,817 | Wheaton et al. | July 11, 1950 |

FOREIGN PATENTS

| Number | Country | Date |
| --- | --- | --- |
| 235,437 | Great Britain | June 18, 1925 |